United States Patent Office 2,933,493
Patented Apr. 19, 1960

2,933,493

16,17-OXIDO-11-DEHYDROCORTICOSTERONE AND ITS ESTERS

George I. Poos, Ambler, Pa., and Lewis H. Sarett, Princeton, N.J., assignors to Merck & Co., Inc., Rahway, N.J., a corporation of New Jersey No Drawing. Original application June 30, 1954, Serial No. 440,550, now Patent No. 2,809,967, dated October 15, 1957. Divided and this application September 19, 1956, Serial No. 610,710

4 Claims. (Cl. 260—239.55)

This invention relates to steroids and in particular to 16,17-oxido-11-dehydrocorticosterone esters, to processes for preparing these compounds and to intermediate compounds thus obtained. This application is a division of our application Serial No. 440,550, filed June 30, 1954, now U.S. Patent No. 2,809,967.

The compounds which are the subject of the invention are 16,17-oxido-11-dehydrocorticosterone esters which have the following general formula:

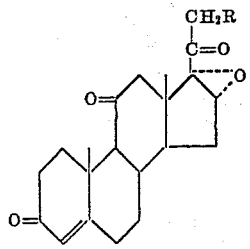

wherein R is an acyloxy group having a chain length of from two to ten carbon atoms. These compounds may be readily converted to valuable steroids such as cortisone.

The 16,17-oxido-11-dehydrocorticosterone esters are prepared by reacting 3-ethylenedioxy-$\Delta^{5,16}$-pregnadiene-11,20-dione (Compound I) with hydrogen peroxide in the presence of a base to produce 3-ethylenedioxy-16,17-oxido-$\Delta^5$-pregnene-11,20-dione (Compound II). This compound is then treated with an organic oxalate in the presence of a basic substance to form the corresponding ester of 3-ethylenedioxy-16,17-oxido-$\Delta^5$-pregnene-11,20-dione-21-oxalyl acid (Compound III) and also 17-hydroxy - 21b - carbomethoxy - 16,21b - $\gamma$ - pyrenone (Compound IV). The ester of 3-ethylenedioxy-16,17-oxido-$\Delta^5$-pregnene-11,20-dione-21-oxalyl acid is then hydrolyzed, treated with iodine in the presence of a base, and the resulting iodoketone is then reacted with a salt of a carboxylic acid to form a 21-ester of 3-ethylenedioxy - 16,17 - oxido - $\Delta^5$ - pregnene - 21 - ol - 11,20-dione (Compound V). This latter compound may be subjected to hydrolysis to form the corresponding 21-ester of 16,17-oxido-11-dehydrocorticosterone (Compound VI).

As an alternate procedure, the 16,17-oxido-11-dehydrocorticosterone esters may be prepared by reacting 3-ethylenedioxy-$\Delta^{5,16}$-pregnadiene-11,20-dione (Compound I) with an organic oxalate in the presence of a basic substance to form an ester of 3-ethylenedioxy-$\Delta^{5,16}$-pregnadiene-11,20-dione-21-oxalyl acid (Compound IX). This ester may be saponified to produce the corresponding acid (Compound X). The 3-ethylenedioxy-$\Delta^{5,16}$-pregnadiene-11,20-dione-21-oxalyl acid is then treated with iodine in the presence of a basic substance and the resulting iodoketone is then reacted with a salt of a carboxylic acid to form a 21-ester of 3-ethylenedioxy-$\Delta^{5,16}$-pregnadiene-21-ol-11,20-dione (Compound XI). This latter compound may then be reacted with hydrogen peroxide in the presence of a base to form the corresponding 21-ester of 3 - ethylenedioxy - 16,17 - oxido - $\Delta^5$-pregnene - 21 - ol - 11,20-dione (Compound V).

The 21-ester of 3-ethylenedioxy-16,17-oxido-$\Delta^5$-pregnene-21-ol-11,20-dione may be converted to the corresponding cortisone ester (Compound VIII) by hydrolytic cleavage with a halogen acid to produce the corresponding 21-ester of 16-halo-$\Delta^4$-pregnene-17$\alpha$,21-diol-3,11,20-trione (Compound VII) which is then subjected to reductive dehalogenation to form the cortisone ester. The 21-ester of 16,17-oxido-11-dehydrocorticosterone (Compound VI) may be converted to the corresponding 21-ester of cortisone (Compound VIII) by hydrolysis with a halogen acid and reductive removal of the 16-halogen. These reactions may be chemically represented wherein R is an acyloxy group and R' is an alkoxy group as follows:

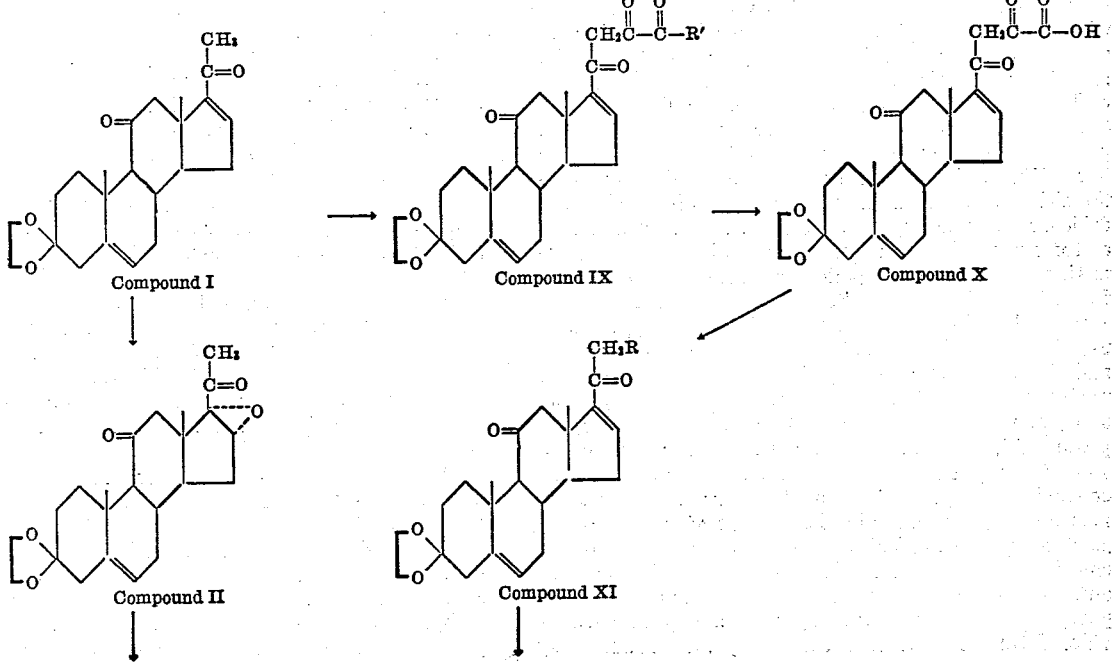

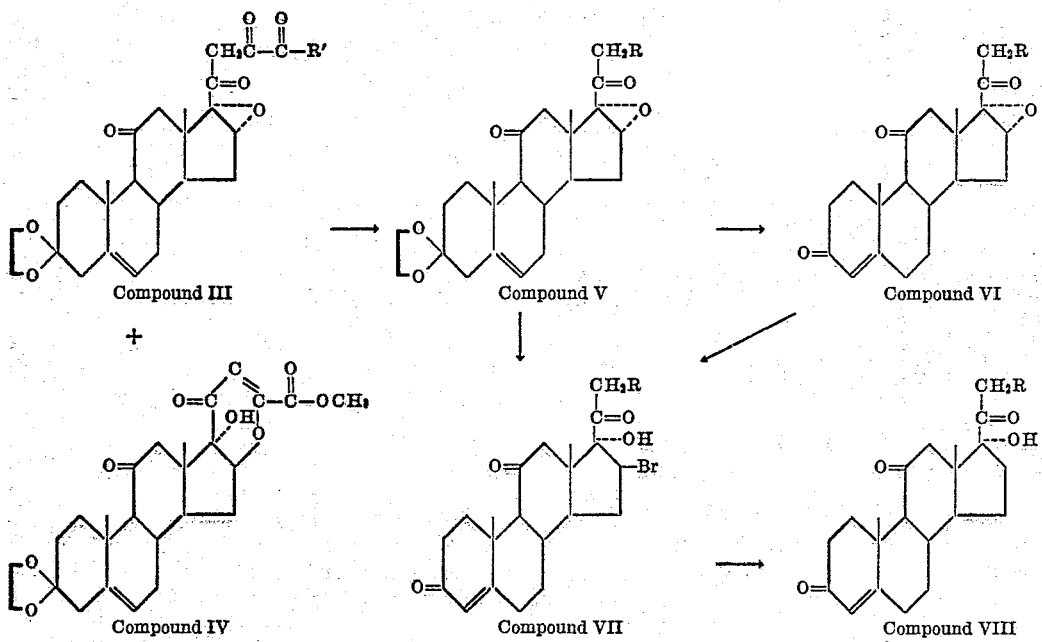

The 3-ethylenedioxy-Δ$^{5,16}$-pregnadiene-11,20-dione may be converted to 3-ethylenedioxy-16,17-oxido-Δ$^5$-pregnene-11,20-dione by treating with hydrogen peroxide in the presence of a base. This reaction proceeds most favorably in a solvent such as methanol, ethanol, propanol, butanol or the like. The basic substance may be any of the conventional bases, such as the alkali metal hydroxides, carbonates or bicarbonates. Typical examples of such compounds are potassium hydroxide, sodium hydroxide, sodium carbonate, potassium carbonate and potassium bicarbonate. The reaction proceeds most favorably at room temperature in from one to twenty hours. The product may be recovered by diluting the reaction medium with water which precipitates the product which may then be filtered from the solution. The product may be further purified by recrystallization.

The 3-ethylenedioxy-16,17-oxido-Δ$^5$-pregnene-11,20-dione is converted to the ester of 3-ethylenedioxy-16,17-oxido-Δ$^5$-pregnene-11,20-dione-21-oxalyl acid by reacting with an organic oxalate in the presence of a basic substance. This reaction is preferably carried out under anhydrous conditions. The reaction proceeds most favorably when carried out in a solvent for the reactants. Suitable solvents are hexane, benzene, toluene, xylene, petroleum ether, ether, dioxane, tetrahydrofuran and the like. The basic substance may be any of the conventional bases such as an alkali metal or its hydroxide, hydride or alkoxide, but it is preferred to use an alkoxide, as for example sodium methoxide, sodium ethoxide, potassium methoxide or potassium ethoxide. The ester formed will depend on the particular oxalate selected. Any of the oxalates may be used but it is preferred to use the lower dialkyl oxalates such as dimethyl oxalate and diethyl oxalate thereby forming the corresponding methyl or ethyl ester. The reaction proceeds favorably at room temperature in from 14 to 20 hours for completion although other temperatures, such as for 0° to 100° C. may be used. The reaction product is most conveniently separated from the reaction mixture by neutralizing the mixture by the addition of mineral or organic acid in theoretical amount such as sulfuric, hydrochloric, phosphoric or acetic acids or by the addition of an excess of an acidic buffer such as sodium dihydrogen phosphate and then extracting with a solvent such as chloroform. The extract containing the product may then be concentrated to dryness to remove the excess oxalate. A by-product of this reaction is the isomeric 17-hydroxy-21b-carbomethoxy-16,21b-γ-pyrenone which in itself is useful for producing other steroids.

The ester of 3-ethylenedioxy-16,17-oxido-Δ$^5$-pregnene-11,20-dione-21-oxalyl acid is converted to the 21-ester of 3-ethylenedioxy-16,17-oxido-Δ$^5$-pregnene-21-ol,-11,20-dione. This conversion is carried out by first reacting the oxalyl ester compound with iodine in the presence of a base followed by alkaline cleavage to form the corresponding 21-iodo compound. The reaction is most conveniently carried out in methanolic sodium methoxide although other alcohols and alkali metal alkoxides may be used. One equivalent of base and iodine are added and then after rapid decolorization is complete another equivalent of base is added. The reaction is complete after standing at 0° C. for one to twenty hours or at room temperature for one-half to five hours. After the reaction is complete the iodo compound may be recovered if desired by extracting with ether and then evaporating the ether. It is desirable in carrying out the reaction to protect the reaction mixture and the product from light in order to avoid decomposition of the product. The iodo compound is then reacted with an alkali metal salt of a carboxylic acid to form the corresponding 21-ester of 3-ethylenedioxy-16,17-oxido-Δ$^5$-pregnene-21-ol-11,20-dione. Typical examples of suitable metal salts are sodium acetate, potassium acetate, sodium, sodium propionate and sodium benzoate. This reaction is conveniently carried out by heating a solution of the iodo compound dissolved in a suitable solvent such as acetone under reflux with a potassium salt of a lower carboxylic acid for one-quarter to four hours. After completion of the reaction, the product is readily recovered by evaporating the solvent under diminished pressure, extracting the resulting residue with ether and then evaporating the ethereal extract.

The 21-ester of 3-ethylenedioxy-16,17-oxido-Δ$^5$-pregnene-21-ol-11,20-dione is hydrolyzed to form the corresponding 21-ester of 16,17-oxido-11-dehydrocorticosterone. This hydrolysis is readily achieved by treating with an acid in a suitable solvent such as methanol, ethanol, acetone or tetrahydrofuran. Strong acids such as hydrochloric acid, sulfuric acid, perchloric acid and p-toluene sulfonic acid used in dilute concentrations are preferred for effecting the hydrolysis. Temperatures ranging from about 20 to 100° C. are usually employed to accomplish the hydrolysis. At the reflux temperature of the solvent several minutes to one hour are ordinarily adequate for completing the reaction. The reaction mixture, following completion of the reaction, may be diluted with water to precipitate the desired 21-ester of 16,17-oxido-11-dehydrocorticosterone which may be separated by filtration and then dried.

The 3-ethylenedioxy-$\Delta^{5,16}$-pregnadiene-11,20-dione is reacted with an organic oxalate in the presence of a basic substance to form the corresponding ester of 3-ethylenedioxy-$\Delta^{5,16}$-pregnadiene-11,20 - dione - 21 - oxalyl acid. This reaction is generally carried out under anhydrous conditions. The reactants are preferably brought together in a solvent. Suitable solvents are hexane, benzene, toluene, xylene, petroleum ether, ether, dioxane, tetra hydrofuran and the like. The basic substances may be any of the conventional bases such as, an alkali metal or its hydroxide, hydride or alkoxide, but it is preferred to use alkoxides, as for example, sodium methoxide, sodium ethoxide, potassium methoxide or potassium ethoxide. The oxalyl ester which is formed will depend on the particular oxalate selected. Any of the oxalates may be used but it is preferred, however, to use the lower dialkyl oxalates such as, dimethyl oxalate and diethyl oxalate, thereby forming the corresponding methyl or ethyl ester. The reaction proceeds favorably at room temperature in from 14 to 20 hours although other temperatures, such as 0 to 100° C., may be used. The reaction product is most conveniently separated from the reaction mixture by neutralizing the mixture by the addition of mineral or organic acid in theoretical amount such as sulfuric, hydrochloric, phosphoric or acetic acids or by the addition of an excess of an acidic buffer such as sodium dihydrogen phosphate and then extracting with a solvent such as chloroform. The extract containing the product may then be concentrated to dryness to remove the excess oxalate.

The ester of 3-ethylenedioxy-$\Delta^{5,16}$-pregnadiene-11,20-dione-21 glyoxalic acid may be converted to the corresponding acid by saponifying the ester. The saponification of the ester may be carried out by treating with any base such as an alkali metal hydroxide, carbonate, alkoxide or the like. The reaction is preferably carried out in water in the presence of a solvent such as an ether or hydrocarbon with an alkali metal hydroxide. Typical examples of such solvents are methyl ether, ethyl ether, methyl ethyl ether, toluene and benzene. The acid salt thus formed may be treated with an acidic agent to form the 3-ethylene-dioxy-$\Delta^{5,16}$-pregnadiene-11,20-dione-21-oxalyl acid. Any acid may be used for this step but it is preferred to use an acidic buffer such sodium dihydrogen phosphate. The acids are particularly useful in themselves for separting the racemic steroids into their optical antipodes. As for example, upon intimately contacting the racemic steroid acid with an optically active base in a suitable solvent medium, the acidic compound reacts with the base to form a mixture of the $d$ and $l$ salts which may be separated by fractional crystallization from suitable solvents.

The 3-ethylenedioxy-$\Delta^{5,16}$-pregnadiene-11,20-dione-21-oxalyl acid is converted to the 21-ester of 3-ethylenedioxy-$\Delta^{5,16}$-pregnadiene-21-ol-11,20-dione. This conversion is carried out by first reacting the 3-ethylenedioxy-$\Delta^{5,16}$-pregnadiene-11,20-dione-21-oxalyl acid in a mildly alkaline solution such as aqueous disodium hydrogen phosphate with iodine. The reaction is completed by adding a strong base such as potassium hydroxide and allowing the reaction mixture to stand at approximately 0° to 25° C. for about one-half to twenty hours. The iodo compound may then be recovered if desired by extracting with ether and then evaporating the ether solution to dryness. It is desirable in carrying out the reaction to protect the reaction mixture and the product formed from light in order to avoid decomposition of the product. The iodo compound is then reacted with an alkali metal salt of a carboxylic acid to form the corresponding 21-ester of 3-ethylenedioxy-$\Delta^{5,16}$-pregnadiene-21-ol-11,20-dione. Typical examples of such salts are sodium acetate, potassium acetate, sodium propionate and sodium benzoate. This reaction is preferably carried out by heating a solution of the iodo compound dissolved in acetone under reflux with a potassium salt of a lower carboxylic acid for about one-quarter to four hours. The product may be readily recovered by evaporating the solvent under diminished pressure, extracting the resulting residue with ether and evaporating the ethereal extract.

The 21-ester of 3-ethylenedioxy-$\Delta^{5,16}$-pregnadiene-21-ol-11,20-dione may be converted to the corresponding 21-ester of 3-ethylenedioxy-16,17-oxido-$\Delta^{5}$-pregnene-21-ol-11,20-dione by treating with hydrogen peroxide in the presence of a base. This reaction proceeds most favorably in a solvent such as methanol, ethanol, propanol, butanol, or the like. The base may be any of the basic substances such as alkali metal hydroxides, carbonates or bicarbonates. Typical examples of such compounds are potassium hydroxide, sodium hydroxide, sodium carbonate, sodium bicarbonate and potassium bicarbonate. The reaction proceeds most favorably at room temperature in from one to twenty hours. The product may then be recovered by diluting the reaction medium with water which precipitates the product which may then be filtered from the solution. The product may be further purified by recrystallization.

The 21-ester of 3-ethylenedioxy-16,17-oxido-$\Delta^{5}$-pregnene-21-ol-11,20-dione may be converted to the 21-ester of 16-halo-$\Delta^{4}$-pregnene-17$\alpha$,21 - diol - 3,11,20 - trione by cleavage of the oxido function with hydrogen halides. Although hydrochloric and hydroiodic acids may be used, it is preferred to use hydrobromic in the presence of a suitable solvent such as acetic acid or propionic acid. The reaction proceeds rapidly at room temperature although increased reaction time and elevated temperature may be employed. The reaction product can be recovered by filtration or by dilution of the reaction mixture with water and extraction with a suitable solvent such as chloroform.

The 21-ester of the 16-halo-$\Delta^{4}$-pregnene-17$\alpha$,21-diol-3,11,20-trione is then reduced to form the corresponding ester of cortisone. Although a variety of mild chemical and catalytic reducing methods may be employed, it is preferred to treat the 16-bromo-21-ester of cortisone with nickel catalyst in a boiling solvent such as ethanol. The product may be recovered by filtration from the catalyst and concentration of the solvent.

The following examples are given for purposes of illustration.

*Example 1*

One milliliter of 2 N sodium methoxide was concentrated to dryness and the residue was heated briefly at 100° C. under vacuum. To this dried sodium methoxide were added 300 mg. of dimethyl oxalate, 3 ml. of dry benzene and 250 mg. of 3-ethylenedioxy-$\Delta^{5,16}$-pregnadiene-11,20-dione. The reaction flask was stoppered tightly and the contents were stirred at room temperature overnight. A mixture of excess sodium dihydrogen phosphate and chloroform was added to the reaction vessel with rapid stirring; the chloroform was withdrawn and the aqueous part was extracted with chloroform. The combined chloroform solution was dried over magnesium sulfate and concentrated to dryness. The residue was warmed under high vacuum until all of the excess oxalate was removed. The crystals remaining were the methyl ester of 3-ethylenedioxy-$\Delta^{5,16}$-pregnadiene-11,20-dione-21-oxalyl acid; purified by recrystallization from ethyl acetate-ether, melting point 150–155° C.; $\lambda$ maximum 305 m$\mu$, E mol. 8,770.

Example 2

Saponification of the product of Example 1 by shaking a benzene-ether solution with 1 N potassium hydroxide gave the potassium salt and then acidification of the alkaline solution with sodium dihydrogen phosphate and extraction with chloroform gave the 3-ethylenedioxy-$\Delta^{5,16}$-pregnadiene-11,20-dione - 21 - oxalyl acid, melting point 173–183° C. (dec.).

Example 3

A solution of 2.25 grams of disodium hydrogen phosphate in 50 ml. of water was overlayered with 4 ml. of ether containing 210 mg. of the methyl ester of 3-ethylenedioxy-$\Delta^{5,16}$-pregnadiene-11,20-dione - 21 - oxalyl acid. The reaction mixture was stirred rapidly and treated dropwise with a solution of 118 mg. of iodine in 10 ml. of ether. Five minutes after the addition of iodine was complete, 2 ml. of 1 N potassium hydroxide solution was added. The mixture was stirred briefly at room temperature and then stored overnight in the icebox. The reaction mixture was extracted with ether and the ether solution was dried and concentrated. The crude iodoketone obtained in this fashion was dissolved in 7 ml. of acetone and heated under reflux for one hour with 500 mg. of moist potassium acetate. After removing the acetone under vacuum, water was added and the organic material was extracted with benzene-ether. The benzene-ether solution was dried and concentrated and the product was recovered by chromatography over alumina. Elution with ether-chloroform gave 3-ethylenedioxy-$\Delta^{5,16}$-pregnadiene-11,20-dione-21-ol-21-acetate purified by recrystallization from ether; melting point 194–197° C.: 206–208° C.; $\lambda$ max. 236 m$\mu$, E mol. 8,770.

Example 4

To a solution of 500 mg. of 3-ethylenedioxy-$\Delta^{5,16}$-pregnadiene-11,20-dione in 30 ml. of methanol were added one ml. of 4 N sodium hydroxide and 3 ml. of 30% hydrogen peroxide. After two hours at room temperature, the reaction mixture was diluted to 100 mg. with ice-water and the crystalline product which separated was collected on a filter, washed thoroughly with water and dried. Recrystallization from benzene gave pure 3-ethylenedioxy-16,17-oxido-$\Delta^5$-pregnene-11,20-dione, melting point 209–211° C.

Example 5

To the dried sodium methoxide from 1.5 ml. of a 1.90 N sodium methoxide solution were added 425 mg. of methyl oxalate, 5 mg. of dry benzene and 360 mg. of 3-ethylenedioxy - 16,17-oxido-$\Delta^5$-pregnene-11,20 - dione. After one hour, excess sodium dihydrogen phosphate and chloroform were added to the reaction mixture and the aqueous part was extracted with additional chloroform. The combined chloroform extracts were dried and concentrated and the residue was warmed under high vacuum to remove excess methyl oxalate. Purification of the product by recrystallization from benzene gave methyl ester of 3 - ethylenedioxy - 16,17 - oxido - $\Delta^5$ - pregnene-11,20 - dione - 21 - oxalyl acid, melting point 177–182° C., $\lambda$ max. 287.5 m$\mu$, E mol. 8,090. Extension of the reaction time resulted in the production of the isomeric 17-hydroxy-21b-carbomethoxy-16,21b-pyrenone as a second product which could be purified by recrystallization from benzene. The melting point of the compound was 254 to 256° C., $\lambda$ max. 288 m$\mu$, E mol. 8,000.

Example 6

A suspension of 340 mg. of the methyl ester of 3-ethylenedioxy - 16, 17 - oxido - $\Delta^5$ - pregnene - 11,20 - dione-21 - oxalyl acid in 10 ml. of methanol was cooled to 0° C. and then with stirring treated first with 0.3 ml. of 2 N sodium methoxide solution and then a solution of 180 mg. of iodine in 10 ml. of methanol. After ten minutes at 0° C. an additional 0.4 ml. of 2 N sodium methoxide was added and the reaction mixture was allowed to stir cold for two hours. Twenty milliliters of water was added and the methanol was distilled under vacuum. The aqueous residue was extracted with chloroform and the chloroform solution was dried and concentrated. The crude residual iodo-ketone was dissolved in 15 ml. of acetone and heated under reflux for one hour with one gram of moist potassium acetate. Inorganic salts were separated by filtration and the filtrate was concentrated to dryness. The residue was dissolved in chloroform, washed with water, dried and concentrated. Chromatography of the residue over alumina gave in the benzene eluate 3-ethylenedioxy - 16,17 - oxido - $\Delta^5$ - pregnene - 21 - ol-11,20-dione 21-acetate; purified by recrystallization from ether, melting point 193–194° C.

Example 7

Twenty milligrams of 3 - ethylenedioxy - 16,17 - oxido-$\Delta^5$ - pregnene - 21 - ol - 11,20 - dione 21 - acetate in 2.5 ml. of acetone containing 0.03 ml. of 78% sulfuric acid was heated under reflux for 15 minues. The reaction mixture was diluted wih water, the acetone was evaporated and the aqueous residue was extracted with ethyl acetate. The ethyl acetate solution was dried over magnesium sulfate and concentrated. Crystallization of the residue from ethyl acetate gave pure $dl$ - 16,17 - oxido - 11-dehydrocorticosterone acetate, melting point 214–216° C.

Example 8

Forty-five milligrams of 3 - ethylenedioxy - 16,17-oxido - $\Delta^5$ - pregnene - 21 - ol - 11,20 - dione 21-acetate was suspended in 0.4 ml. of acetic acid. The mixture was chilled to ca. 15° C. and treated with 0.1 ml. of 32% hydrogen bromide in acetic acid. Dissolution of the starting compound was soon followed by crystallization of the product. After 15 minutes, the mixture was cooled and the crystals were collected, washed with acetic acid and ether and dried. The product, 16-bromocortisone acetate, could be purified by recrystallization from benzene; melting point 235–240° C. (dec.).

A solution of 35 mg. of 16-bromocortisone acetate in 3 ml. of ethanol was heated under reflux with 15 mg. of Raney nickel for seven hours. After filtration from the catalyst, concentration of the ethanol gave $dl$-cortisone acetate.

Any departure from the above description which conforms to the present invention is intended to be included within the scope of the claims.

What is claimed is:
1. A compound having the formula

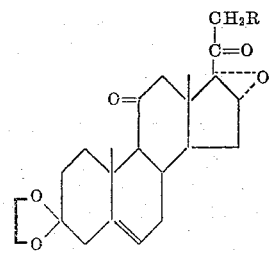

wherein R is selected from the class consisting of hydrogen and

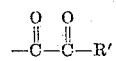

where R' is selected from the class consisting of hydroxy and lower alkoxy.

2. 3-ethylenedioxy - 16,17 - oxido - $\Delta^5$ - pregnene - 11, 20-dione.

3. A lower alkyl ester of 3 - ethylenedioxy - 16,17-oxido - $\Delta^5$ - pregnene - 11,20 - dione-21-oxalyl acid.

4. Methyl ester of 3-ethylenedioxy-16,17 - oxido-$\Delta^5$-pregnene-11,20-dione-21-oxalyl acid.

References Cited in the file of this patent

UNITED STATES PATENTS

| | | |
|---|---|---|
| 2,705,720 | Lyttle et al. | Apr. 5, 1955 |
| 2,752,339 | Julian et al. | June 26, 1956 |
| 2,752,366 | Hogg et al. | June 26, 1956 |
| 2,759,928 | Farrar et al. | Aug. 21, 1956 |

OTHER REFERENCES

Pincus et al.: "The Hormones," vol. III, pages 549, 550, Academic Press Inc., New York (1954).